E. F. SCHAUB.
CUSPIDOR CARRIER.
APPLICATION FILED OCT. 22, 1910.
1,067,278.
Patented July 15, 1913.
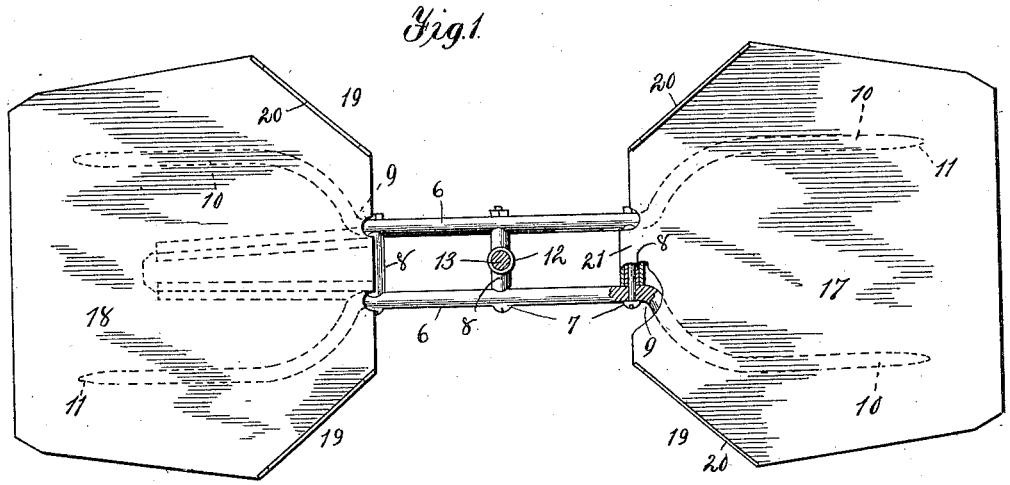
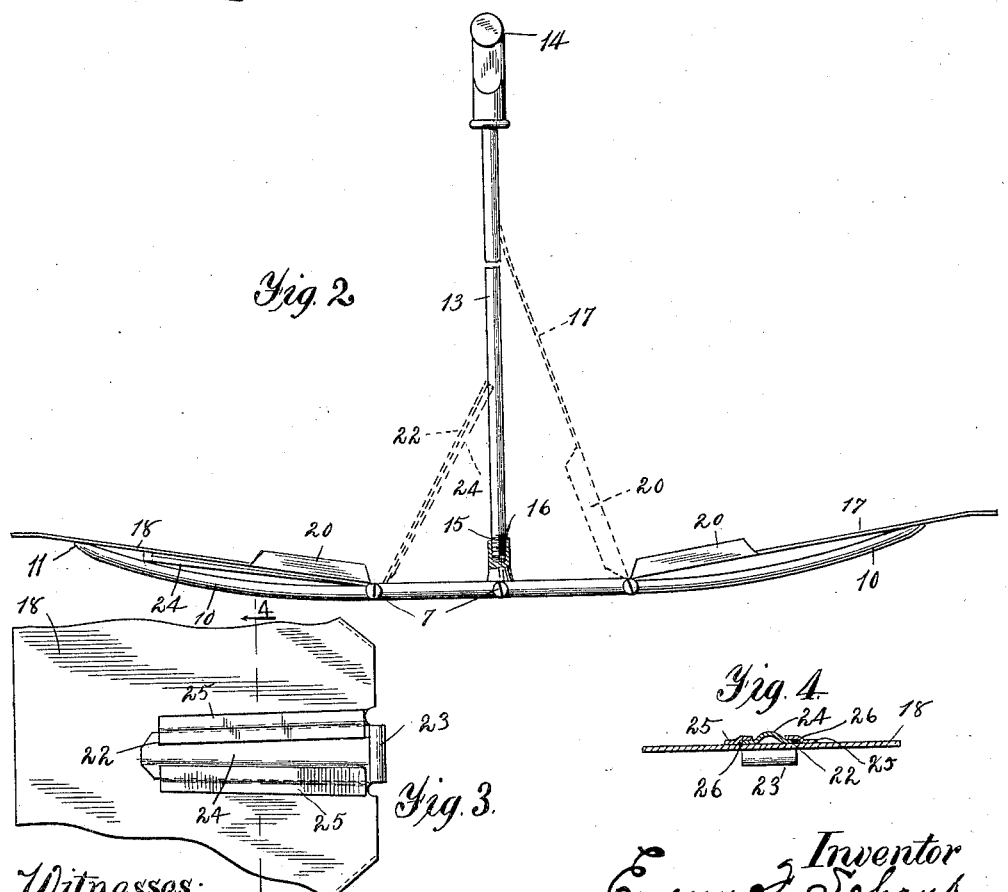
Witnesses:
C. F. Bassett
M. A. Milord
Inventor
Eugene F. Schaub
By Frederick Benjamin
Atty.

UNITED STATES PATENT OFFICE.

EUGENE F. SCHAUB, OF ST. ELMO, ILLINOIS.

CUSPIDOR-CARRIER.

1,067,278.

Specification of Letters Patent. Patented July 15, 1913.

Application filed October 22, 1910. Serial No. 588,404.

*To all whom it may concern:*

Be it known that I, EUGENE F. SCHAUB, citizen of the United States, residing at St. Elmo, in the county of Fayette and State of Illinois, have invented certain new and useful Improvements in Cuspidor-Carriers, of which the following is a specification.

My invention relates to lifting and carrying devices, and has particular reference to means for supporting cuspidors while being conveyed from place to place, such contrivances being especially useful when it is necessary to remove the utensils to a convenient location for the purpose of cleaning them.

This invention embodies improvements in the device shown in my co-pending application, filed Feb. 3, 1910, Serial Number 541,680.

The chief objects of the improvements which constitute the subject matter of this application for patent are:—to provide a simple, convenient and inexpensive device for lifting and carrying cuspidors; to furnish a carrier that will serve to support or hold two cuspidors at the same time and while so supported allow the utensils to be conveyed to any desired point, and to produce a lifting device so designed that the supporting members may be made to engage the utensils while the latter are resting upon the floor, thus avoiding the necessity of lifting the cuspidors with the hands, either in loading or unloading the carrier.

A further object of the present invention is to provide an apparatus that will support cuspidors differing in shape so that other than the ordinary forms may be handled with equal facility.

The desired results are obtained by employing the apparatus illustrated in the accompanying drawing which forms a part of this application, the details of construction being disclosed in the following views:—

Figure 1 is a top plan view of my improved cuspidor lifting and carrying device, with the handle broken away; Fig. 2 is a side elevation of the complete device; Fig. 3 is a bottom plan view of a portion of one of the hinged plates showing the detachable hinge; Fig. 4 is a sectional view on the line 4—4 of Fig. 3.

Referring to the details of the drawing the numeral 6 indicates two rods of equal length arranged parallel and securely fastened together by bolts 7 to form a base member the said bolts passing through spacing sleeves 8. The ends of the said rods are bent away from each other, as indicated at 9 and then curved for a short distance, forming tines 10, the tines upon one rod coöperating with those upon the companion rod to form lifting forks, which extend in opposite directions as shown in the drawing. These forks are bent so that they are inclined slightly upward when the base member 6 is in a horizontal position, as shown in Fig. 2, and the ends of the tines are bluntly pointed or tapered as shown at 11. There are three of the said spacing sleeves 8 arranged at equal distances apart, the outer sleeves being located at the bases of the forks. The central sleeve has an upward extending branch 12, to which is attached a lifting bar 13, having its upper end supplied with a convenient handle 14. The lower end of the rod 13 is threaded as indicated at 15 and removably engages similar threads in a socket 16 formed in the end of the branch 12.

Normally resting upon the forks are hinged supporting plates 17, 18, preferably formed of sheet metal. These plates may be of any desired shape, but I prefer to give them a general rectangular form, as shown, the rear corners being cut away, as indicated at 19, and a narrow portion of the edge upturned to form retaining flanges 20, which serve to prevent the utensil placed on said plate from slipping off from the rear edge while being carried about. Each plate is hingedly attached to the adjacent sleeve 8, and two ways of forming the hinges are shown in the drawing. The plate 17 has an integral lip or flap which is bent around the adjacent sleeve 8 forming an eye or hinge knuckle 21 the end margin of the bent portion being secured to the body of the plate by soldering to form a firm connection. This arrangement permits the plate to be turned upward against the standard or bar 13, as indicated by dotted outlines in Fig. 2, so that it will be out of the way when it is desired to use the fork for lifting a cuspidor, in a manner that will be hereinafter explained. The other plate 18 is shown with a modified hinge which will permit the plate to be readily turned upward or entirely removed. In this case a sheet metal tongue 22 of suitable length has one end turned to form an eye 23, engaging the adjacent spacing sleeve 8, solder being used to close the sleeve as in the case of the previously described eye 21. The said tongue 22 is made slightly tapering, and is struck up along the median line to form a stiffening ridge or corrugation 24. The under surface of the plate 18 is furnished with a slideway for the tongue, comprising strips 25 having their inner margins raised forming grooves 26 to accommodate the lateral margins of the tongue, and when the latter is inserted beneath the edges of the said strips, the plate will be held in place by friction, but may be readily removed when required in which case the tongue may be turned to the position shown by dotted outlines in Fig. 2, where it will be out of the way of a cuspidor which may be engaged by the fork.

The manner of using the device will be readily understood from a general description. Cuspidors of any shape or form may be handled by placing them upon the plates 17, 18, when the latter are resting upon the forks as shown. The purpose of the forks is to engage the constricted neck of cuspidors as usually constructed. Thus two such utensils may be carried at the same time, either upon the plates or suspended from the forks, or one cuspidor may be carried upon a plate, while the other is carried by one of the forks.

The vertical bar 13 is made removable so that the device may be conveniently packed in a small compass for shipping.

Having thus described my invention what I claim as new is:—

1. In a lifting and carrying device, the combination of a handle bar, a base member comprising two parallel rods having their ends bent to form forks, spacing sleeves connecting said rods, and plates hingedly and removably attached to said sleeves and supported by said forks.

2. In a lifting and carrying device, the combination of a removable handle bar, a base member comprising two parallel rods having their ends bent to form forks, spacing sleeves connecting said rods, removable hinged plates supported on said forks, hinges for said plates, said hinges comprising straps slidably engaging said plates, and eyes on said straps embracing the adjacent spacing sleeves.

3. In a lifting and carrying device of the character stated, the combination with a supporting frame, and a handle therefor, of a removable plate hingedly attached to said frame, and a hinge for said plate comprising a strap pivotally attached to said frame and frictionally engaging suitable grooves in said plate.

In testimony whereof I affix my signature in the presence of two witnesses.

EUGENE F. SCHAUB.

Witnesses:
  F. H. YATES,
  R. KELLEY.

---

Copies of this patent may be obtained for five cents each, by addressing the "Commissioner of Patents, Washington, D. C."